UNITED STATES PATENT OFFICE.

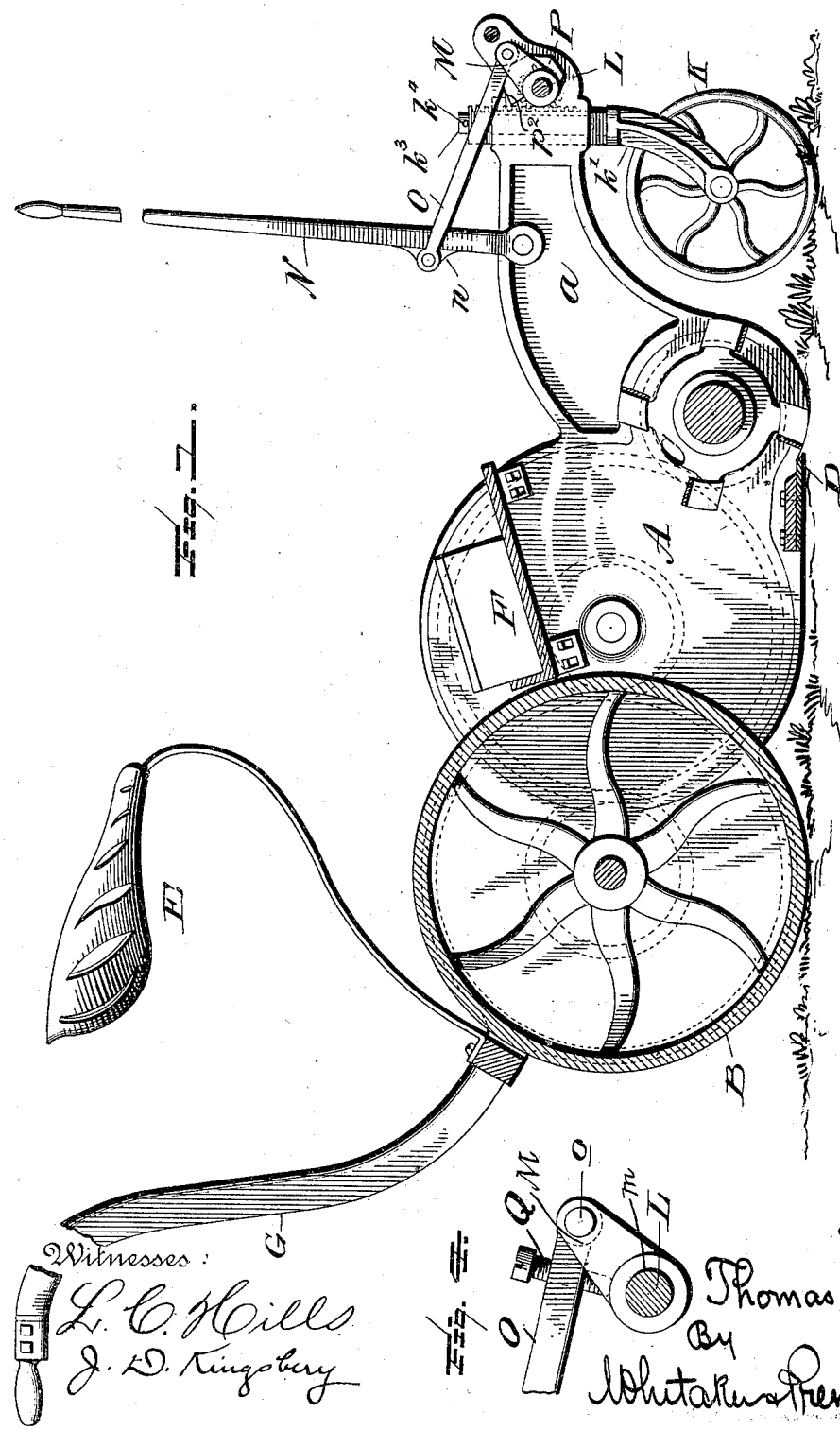

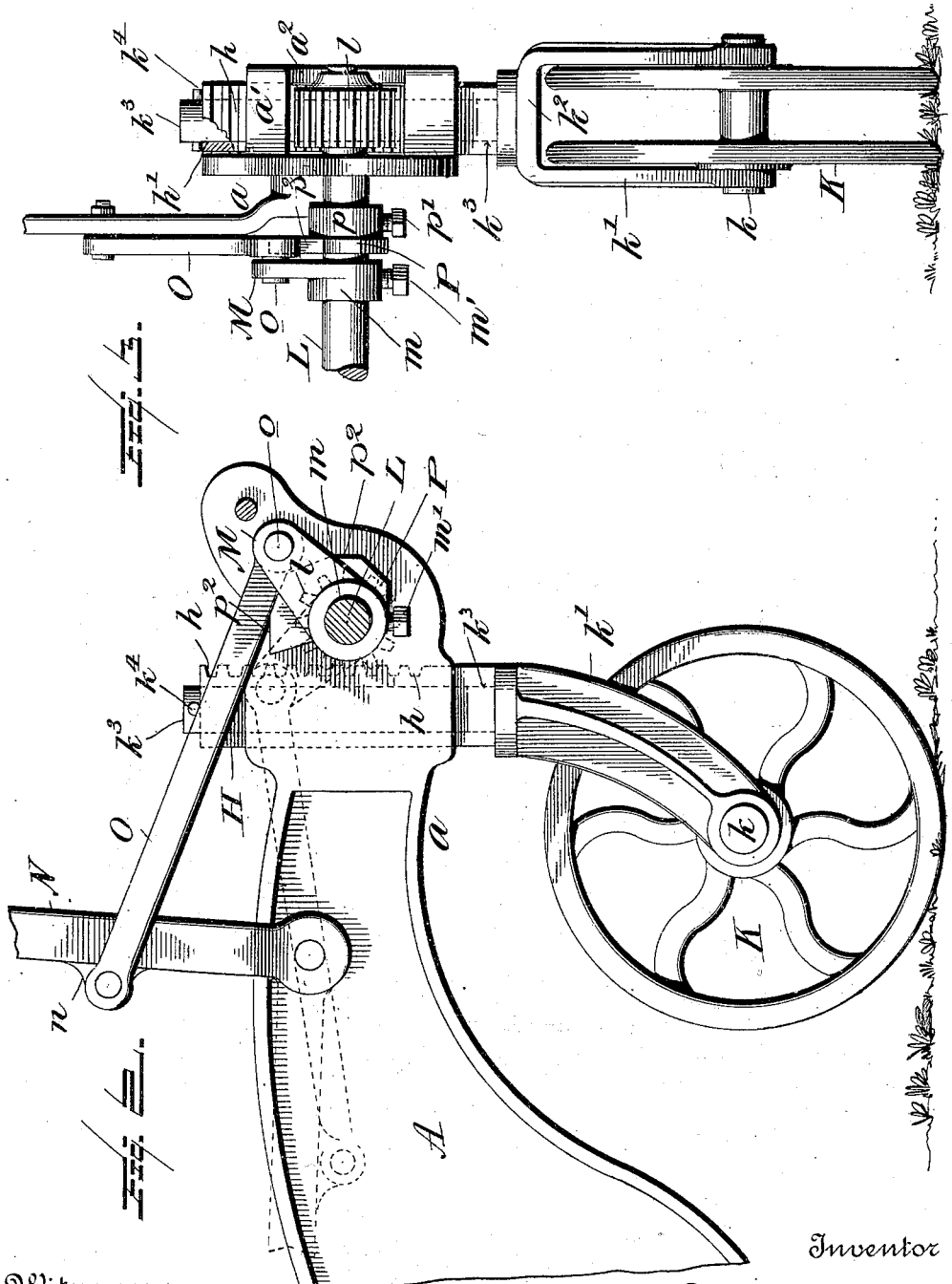

THOMAS COLDWELL, OF NEWBURG, NEW YORK.

LAWN-MOWER.

SPECIFICATION forming part of Letters Patent No. 644,793, dated March 6, 1900.

Application filed November 13, 1899. Serial No. 736,847. (No model.)

*To all whom it may concern:*

Be it known that I, THOMAS COLDWELL, a citizen of the United States, residing at Newburg, in the county of Orange and State of New York, have invented certain new and useful Improvements in Lawn-Mowers; and I do hereby declare the following to be a full, clear, and exact description of the invention, such as will enable others skilled in the art to which it appertains to make and use the same.

My invention consists in the novel features hereinafter described, reference being had to the accompanying drawings, which illustrate one form in which I have contemplated embodying my invention, and said invention is fully disclosed in the following description and claims.

Referring to the drawings, Figure 1 represents a longitudinal vertical sectional view of a horse lawn-mower having my invention applied thereto. Fig. 2 is an enlarged view of the forward part of the machine illustrated in Fig. 1. Fig. 3 is a front elevation of a portion of one side of the forward part of the machine, illustrating my invention; and Fig. 4 is a detail view of a modified form of my invention.

The objects of my invention are to provide means for raising and lowering the front portion of a lawn-mower, particularly of that style of lawn-mower which is intended to be drawn by a horse, for raising and lowering the cutters out of and into operative position, and for adjustably limiting the downward movement of the machine into operative position to regulate the height of cut.

In the accompanying drawings I have shown my invention applied to one of the types of horse lawn-mower now in use, in which A represents one of the side frames; B, the driving-roller; C, the rotary cutter; D, the stationary cutter; E, the driver's seat; F, the foot-rest, and G the guiding-handles. All these parts are of well-known construction, and as they do not form part of my invention they will not be further described.

Each of the side frames A is provided with a forwardly-extending portion $a$, which is provided near to its forward end with a vertically-disposed sleeve $a'$, preferably square or rectangular in cross-section, in which is located a vertically-sliding block H of a shape to fit said sleeve, but adapted to slide vertically therein. Each of these blocks is provided on its front side with a rack $h$ and with an aperture $h'$, extending through said block longitudinally. Two caster-wheels K are provided for the same, each of which is mounted on a spindle $k$, carried by arms $k'$, depending from a cross-piece $k^2$, which is provided with a stem or shank $k^3$, circular in cross-section, which extends upward through one of the blocks H just described and is secured therein in any desired way, as by a pin or cotter $k^4$, passing through a transverse aperture in the stem or shank, as shown. It will be seen that the spindle is free to turn in the block, but is held from movement longitudinally with respect to the block, and that by moving the block up or down in the sleeve $a'$ the frame of the mower will be correspondingly lowered or raised. In order to operate the blocks simultaneously to raise and lower the blocks in their respective sleeves, a shaft L is mounted in bearings in the side frames, extends transversely across the machine, and is provided at each end with a pinion $l$, which meshes with the teeth in one of the blocks H, a portion of the front wall of each sleeve $a'$ being cut away, as shown at $a^2$ in Fig. 3, to permit the pinion to engage the teeth of the rack. The construction so far described is substantially identical with that shown and described by me in my prior patent, No. 475,976, granted to me May 31, 1892. According to my present invention I provide this shaft L, adjacent to one side of the machine, with an operating-arm M, which I prefer to attach, as shown, by providing said arm with a collar $m$, adapted to slip over the shaft L and to be secured adjustably thereto by means of a set-screw $m'$ or equivalent device. I also provide a hand-lever N, which is pivoted to the side frame A, (or other suitable part of the machine and at either side thereof, as desired,) so as to be within easy reach of the driver when sitting on the seat E of the machine. The lever N is provided, preferably on its rear side, with an ear $n$, to which is pivoted one end of a link O, the other end of which is pivotally connected at $o$ to the arm M. It will thus be seen that by drawing the lever N rearward the arm M will cause the shaft L and pinions *l l* to rotate rearwardly, and thus elevate the frame with respect to the blocks and caster-wheels, thus raising the cutters from the ground. The parts are so arranged that when the frame is raised to the highest desired position above the ground the lever N will be nearly horizontal and the pivotal connections of the link O with the lever N and arm M will be in a line extending through or very slightly below the center of the pivotal connection of the hand-lever N with the frame, as shown in dotted lines in Fig. 2, in which position the strain from the arm M to the hand-lever will be in a straight line against the stationary pivot of the hand-lever, and the parts will remain in this position without locking until released by the operator. When the operator throws the hand-lever N forward, the shaft L and pinions *l l* will be rotated forwardly and will permit the frame to descend with respect to the sliding blocks H H and caster-wheels to bring the cutters nearer the ground. I also provide means for adjustably limiting this downward movement of the frame, so that when set to cause the cutters to travel at a certain distance from the ground the frame will always be stopped in that position when the operator throws the lever N forward. In Figs. 1, 2, and 3 I have shown a cam P for this purpose which is formed with a collar $p$, adapted to be slipped over shaft L and moved beneath the link O, where it is secured to the shaft by a set-screw $p'$. This cam has its periphery eccentric to the shaft, and I prefer to form a number of flat faces $p^2$ on its periphery at different distances from the center of its collar $p$ and of the shaft L, as shown, to be engaged by the link O. This cam will be so adjusted on the shaft L that when the hand-lever N is thrown forward the link O will strike and rest upon one of these faces $p^2$ and hold the shaft L in such position that the cutters will be at the desired height from the ground. By changing the adjustment of the cam the height of cut can be altered when desired. In Fig. 4 I have shown a modification of this adjustable stop in which the link O is provided with a set-screw Q, extending through the same in position to engage either the shaft or some part connected therewith, which need not be eccentric—in this instance a part of the collar $m$ of the collar M. With this device the operator can throw the lever N forward, and when the link is arrested by the adjustable stop the descent of the frame will cease and the machine will be in operative position to cut the grass at a given height, which height can be varied by means of the adjustable stop. When the lever N is pulled backward, the front end of the machine will be raised out of operative position and will be locked, as before described.

What I claim, and desire to secure by Letters Patent, is—

1. In a lawn-mower, the combination with the frame provided with cutting mechanism, of supporting-wheels movable vertically with respect to the frame, a shaft operatively connected with said wheels for raising and lowering the same, an arm connected to said shaft, an operating-lever, a link connecting said lever and arm, a cam on said shaft provided with stop portions at different distances from the center of the shaft and means for adjusting said cam on the shaft to bring one of said portions beneath the said link, substantially as described.

2. In a lawn-mower, the combination with the frame provided with cutting mechanism, of supporting-wheels movable vertically with respect to the frame, a shaft operatively connected with said wheels for raising and lowering the same, an arm connected to said shaft, an operating-lever, a link connecting said lever and arm, a cam mounted on said shaft in line with said link and capable of movement around the shaft, said cam having peripheral portions at different distances from the center of said shaft, and means for securing said cam to the shaft, substantially as described.

In testimony whereof I affix my signature in the presence of two witnesses.

THOMAS COLDWELL.

Witnesses:
ALBERT W. MAPES,
HENRY WARDEN MUREFELDT.